May 1, 1956 G. N. HUGHES ET AL 2,744,240
SYSTEM FOR INTEGRATING D.C. VALUES
Filed Jan. 20, 1951
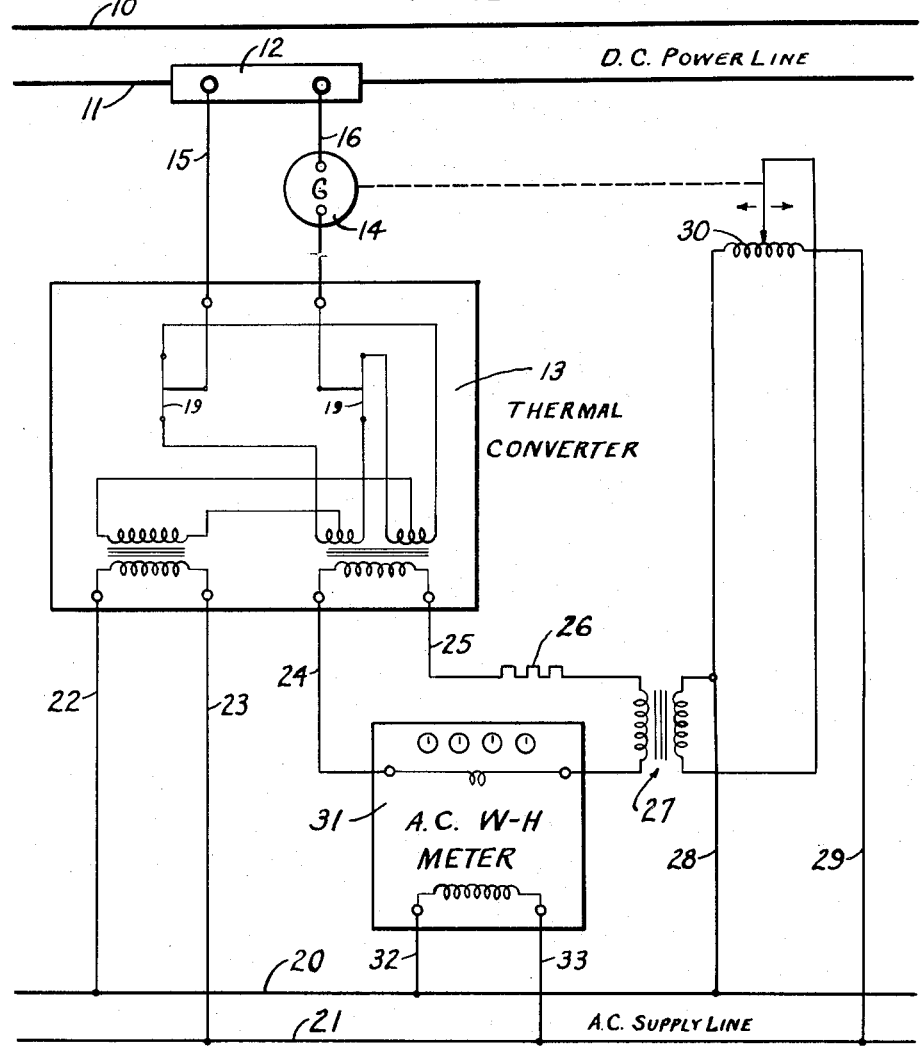
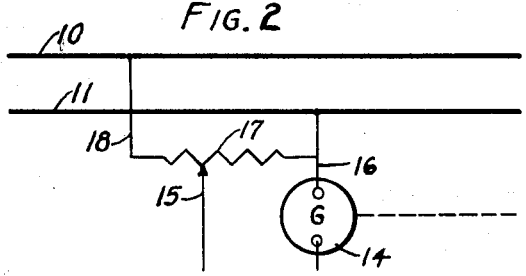
INVENTORS
GUY N. HUGHES &
BY RALPH N. HARDER
*Robert T. Peeler*
ATTORNEY

United States Patent Office 2,744,240
Patented May 1, 1956

2,744,240

SYSTEM FOR INTEGRATING D. C. VALUES

Guy N. Hughes, Maryville, and Ralph N. Harder, Alcoa, Tenn., assignors to Aluminum Company of America, Pittsburgh, Pa., a corporation of Pennsylvania Application January 20, 1951, Serial No. 206,956

4 Claims. (Cl. 324—99)

This invention relates to a system for integrating D. C. values, such as amperes or volts, on an A. C. induction watt-hour meter.

The general object of the invention is to provide a system of integrating D. C. values accurately and economically. A particular object is to provide a system of the character described which combines a thermal converter, for converting alternating currents to D. C. potential, and an integrating A. C. induction meter, which system eliminates the sources of error commonly encountered in the use of D. C. integrating meters.

Further objects and advantages of the invention will appear from the following specification, taken in connection with the accompanying drawing.

In the drawing, Fig. 1 is a diagram showing one form of the invention as applied to the integration of D. C. amperes on an A. C. induction watt-hour meter; and Fig. 2 is a partial diagram corresponding to Fig. 1 showing the changes necessary to convert the system shown in Fig. 1 to the integration of D. C. volts.

As indicated in Fig. 1 a typical system, in accordance with the invention, employs a thermal converter and an A. C. induction watt-hour meter for integrating D. C. amperes. A D. C. power line 10, 11 carries an ampere load which is to be integrated. A standard metering shunt 12 is inserted in the line 11 as a means providing a source of D. C. potential proportional to the current in the D. C. power line 10, 11. This source of D. C. potential is opposed by another source of D. C. potential provided by the thermal converter 13 (to be more fully described hereinafter). The shunt 12 and the output terminals of the thermal converter 13 are connected in opposition to each other, through a galvanometer-controller 14 (which may be of the conventional type or may employ equivalent electronic balancing equipment), by the D. C. circuit 15, 16.

The thermal converter 13 is supplied with two alternating currents from an A. C. supply line 20, 21. One of the currents is supplied by the A. C. circuit 22, 23 connected across the A. C. supply line 20, 21. The A. C. circuit 22, 23 may be considered as a potential circuit, since it is connected in the manner in which voltage leads would be connected to a voltmeter. The input terminals on the thermal converter 13, to which the A. C. circuit 22, 23 is connected, may conveniently be the potential terminals of the conventional thermal converter.

The other current is supplied to the converter 13 by the A. C. circuit 24, 25, through a non-inductive resistance 26 and the secondary of a transformer 27. The A. C. circuit 24, 25 may be considered as a current circuit since it is connected in the manner in which current leads would be connected to an ammeter. The input terminals on the thermal converter 13, to which the A. C. circuit 24, 25 is connected, may conveniently be the current terminals of the conventional thermal converter.

The transformer 27 is energized by the A. C. supply line 20, 21 through the A. C. lines 28, 29 and the variable means 30 (which may be a variable auto transformer). The variable means 30 is responsive to and actuated by the galvanometer-controller 14, as follows. Whenever the D. C. potential of the shunt 12 exceeds that of the thermal converter 13, a current flows in the D. C. circuit 15, 16 in a given direction, and the galvanometer-controller 14 actuates the variable means 30 so as to increase the current in the A. C. circuit 24, 25. Conversely, whenever the D. C. potential of the thermal converter 13 exceeds that of shunt 12, a current flows in the D. C. circuit 15, 16 in an opposite direction, and the galvanometer-controller 14 actuates the variable means 30 so as to decrease the current in the A. C. circuit 24, 25. Thus, the galvanometer-controller 14 tends to stay in neutral position and operates as a null-type instrument. Likewise, the variable means 30 tends to follow fluctuations in the current in the D. C. power line 10, 11, acting as a means producing corresponding fluctuations in the current in the A. C. circuit 24, 25, and causing the output potential of the thermal converter 13 to balance the potential from the metering shunt 12.

The A. C. circuit 24, 25 includes the current coil of an A. C. induction watt-hour meter 31. The potential coil of meter 31 is connected across the A. C. supply line 20, 21 by the A. C. lines 32, 33. This connection is equivalent to a connection across A. C. circuit 22, 23.

From the above description and the diagram of Fig. 1, it will be apparent that the A. C. induction watt-hour meter 31 is responsive to the two currents supplied to the thermal converter 13. It, therefore, may be considered as giving an integrated reading of the power input to the thermal converter 13. Furthermore, this reading of two currents, or power, is a measure of the current in the D. C. power line 10, 11. Therefore, the meter 31 may be calibrated to read directly the D. C. ampere-hours transmitted by the D. C. power line 10, 11.

The system described in connection with Fig. 1 may be modified, in accordance with Fig. 2, to integrate D. C. volts. All that is necessary for this purpose is that the metering shunt 12 be replaced by a voltage divider resistance 17, which is connected across the D. C. power line 10, 11 through a D. C. line 18 and a part of the D. C. line 16. In this case the voltage divider resistance 17 is a means providing a source of D. C. potential proportional to the voltage of the D. C. power line 10, 11, and the A. C. induction watt-hour meter 31 may be calibrated to read directly the D. C. volt-hours.

In either of the systems described, above, it should be noted that the non-inductive resistance 26 and the transformer 27 are not theoretically essential. They are convenient for the purpose of providing an adequate current in the A. C. circuit 24, 25, without unnecessary utilization of A. C. power at high voltage. Also, the resistance 26 aids in keeping the current in phase with the voltage. Similarly the variable means 30 could be inserted in the secondary circuit 24, 25 rather than in the primary circuit 28, 29, of the transformer 27, although it is preferable to employ the variable means 30 in the location shown, since the current transmitted across the brush or contacts is small in the primary circuit. It should also be noted that, while there is a difference between the two current circuits in the thermal converter 13, current variation could be effected in either or both of such circuits, in response to the operation of the galvanometer-controller 14.

In the system shown in Fig. 1, A. C. circuit 22, 23 and the potential coil of the meter 31 are related to each other, and the currents flowing therein do not change unless there is a change in the voltage of the A. C. supply line 20, 21. Thus, any substantially constant voltage may be supplied to circuit 22, 23 and a different substantially constant voltage may be supplied to the potential coil of the meter 31, provided that the currents are kept in substantially constant phase relation. Thus the system show in Fig. 1 may be used for integrating D. C. amperes, while a similar system modified as in Fig. 2 may be used for integrating volts. With such systems an A. C. induction watt-hour meter may be connected with one of its coils in series with the A. C. circuit 24, 25 of the current integrating system and the other of its coils in series with a corresponding A. C. circuit 24, 25 of the voltage integrating system. This meter could then be calibrated to read D. C. kilowatt-hours, provided the A. C. supply in each system was in substantially constant phase relation at substantially constant voltages.

The thermal converter 13 should preferably be a standard, high speed thermal converter of the type described by John H. Miller in United States Patent No. 2,283,566, dated May 19, 1942, also described in an article by Miller in AIEE Transactions, vol. 60 (1941), pages 37 through 40 (same article published in the transactions section of Electrical Engineering for January 1941).

The internal wiring of the thermal converter 13 is shown only diagrammatically on Fig. 1, and corresponds to that shown in Fig. 5 of the aforesaid Miller patent. A poly-phased thermal converter may, of course, be conveniently used by connecting the current terminals in series and the potential terminals in parallel. The thermal converter 13 employs at least two converter circuits, each including thermocouple units 19. The A. C. supply circuits 22, 23 and 24, 25 energize the primaries of these circuits. Alternating currents flow through the respective thermocouple units in accordance with the sum and the difference of the currents in the secondaries of these transformers. A D. C. output is taken from the thermocouple units at points between which there is zero A. C. potential and a thermally produced D. C. potential. The thermocouple units function as both thermocouples and heaters. The operation of the thermal converter 13 is believed fully evident from the foregoing description, and from the aforementioned patent and article (which are incorporated herein by reference).

We claim:

1. A system for integrating D. C. characteristic values, on an A. C. induction watt-hour meter, comprising means providing a source of D. C. potential proportional to a characteristic value of a D. C. power line, a thermal converter providing a source of thermally produced D. C. potential proportional to the product of two alternating currents supplied thereto through two pairs of input terminals, a null-type galvanometer-controller, said sources of D. C. potential being connected in opposition to each other through said galvanometer-controller, an A. C. supply, said input terminals of said converter and said A. C. supply being connected through two A. C. circuits, means actuated by said galvanometer-controller for varying the current in at least one of said A. C. circuits so that the D. C. potential of said converter balances that of said first-mentioned source of D. C. potential, and an A. C. induction watt-hour meter having its coils connected so as to carry currents corresponding to those supplied to said converter by said A. C. circuits.

2. A system for integrating D. C. amperes, on an A. C. induction watt-hour meter, comprising a metering shunt providing a source of D. C. potential proportional to the current in a D. C. power line, a thermal converter providing a source of thermally produced D. C. potential proportional to the product of two alternating currents supplied thereto through two pairs of input terminals, a null-type galvanometer-controller, said sources of D. C. potential being connected in opposition to each other through said galvanometer-controller, an A. C. supply, said input terminals of said converter and said A. C. supply being connected through two A. C. circuits, means actuated by said galvanometer-controller for varying the current in at least one of said A. C. circuits so that the D. C. potential of said converter balances that of said first-mentioned source of D. C. potential, and an A. C. induction watt-hour meter having its coils connected so as to carry currents corresponding to those supplied to said converter by said A. C. circuits, said meter being calibrated to read D. C. ampere-hours.

3. A system for integrating D. C. volts, on an A. C. induction watt-hour meter, comprising a voltage dividing resistance providing a source of D. C. potential proportional to the voltage of a D. C. power line, a thermal converter providing a source of thermally produced D. C. potential proportional to the product of two alternating currents supplied thereto through two pairs of input terminals, a null-type galvanometer-controller, said sources of D. C. potential being connected in opposition to each other through said galvanometer-controller, an A. C. supply, said input terminals of said converter and said A. C. supply being connected through two A. C. circuits, means actuated by said galvanometer-controller for varying the current in at least one of said A. C. circuits so that the D. C. potential of said converter balances that of said first-mentioned source of D. C. potential, and an A. C. induction watt-hour meter having its coils connected so as to carry currents corresponding to those supplied to said converter by said A. C. circuits, said meter being calibrated to read D. C. volt-hours.

4. In a system for integrating D. C. characteristic values, on an A. C. induction watt-hour meter, the combination comprising a thermal converter for converting A. C. input to thermally produced D. C. output potential, said converter having a pair of output terminals and two pairs of input terminals, the latter being connected in two A. C. supply circuits, a null-type galvanometer-controller having one of its terminals connected to one of the output terminals of said converter, the other terminal of said galvanometer-controller and the other output terminal of said converter being adapted for connection in opposition to an external source of D. C. potential proportional to a characteristic value of a D. C. circuit, and means actuated by said galvanometer-controller for varying the current in the A. C. supply circuit to one pair of said input terminals of said converter so that the D. C. potential of said converter will balance that of the external source of D. C. potential, and an A. C. induction watt-hour meter having its coils connected so as to carry currents corresponding to those supplied in said A. C. supply circuits.

References Cited in the file of this patent

UNITED STATES PATENTS

| | | |
|---|---|---|
| 2,115,831 | Widmer | May 3, 1938 |
| 2,137,133 | Dallmann | Nov. 15, 1938 |
| 2,169,101 | La Pierre | Aug. 8, 1939 |
| 2,169,116 | Thompson | Aug. 8, 1939 |
| 2,207,829 | Sell | July 16, 1940 |
| 2,329,423 | Steghart | Sept. 14, 1943 |
| 2,447,321 | Ertzman | Aug. 17, 1948 |
| 2,502,848 | Hughes | Apr. 4, 1950 |